June 11, 1963 M. L. KASBOHM ETAL 3,093,697
PROCESS FOR PRODUCING ACETYLENE
Filed May 27, 1960 5 Sheets-Sheet 1

INVENTORS
MARTIN L. KASBOHM
HARRY J. PORTZER
HARTLEY C. DELLINGER
PAUL D. FRANSON
IRVING A. COHEN

BY *William F Mesinger*
ATTORNEY

3,093,697
PROCESS FOR PRODUCING ACETYLENE
Martin L. Kasbohm and Harry J. Portzer, Buffalo, Hartley C. Dellinger, Tonawanda, and Irving A. Cohen, Buffalo, N.Y., and Paul D. Franson, St. Albans, W. Va., assignors to Union Carbide Corporation, a corporation of New York
Filed May 27, 1960, Ser. No. 32,251
19 Claims. (Cl. 260—679)

This invention relates to an improved process for the production and recovery of acetylene and, more particularly, to an improved process for producing acetylene by the pyrolysis of a suitable hydrocarbon stock and subsequent separation and recovering the acetylene so produced by means of a relatively low pressure-low temperature system.

Regenerative hydrocarbon cracking processes for production of acetylene, wherein a refractory material is heated by products of a combustion reaction and, then, a suitable hydrocarbon stock in gaseous or vaporous form, is exposed to the hot refractory, have been known for many years. Thus far none of these prior art processes has achieved widespread commercial use, the main disadvantage being uneconomically low conversions of hydrocarbons to acetylene.

Similarly known have been acetylene recovery systems operating at relatively high pressures, such as up to 4 to 13 atmospheres or higher, in order to raise the partial pressure of the acetylene in the product gas stream and thus attempt to render the recovery system more efficient. This has required a considerable investment in compressors. Even when low separation temperatures in the order of −50° C. (−58° F.) have been used, high pressures have still been employed to maintain higher acetylene partial pressures. High pressures were particuarly thought to be necessary when the acetylene content of the product gas stream was less than about 10 volume percent.

It is, accordingly, an object of the present invention to produce a valuable acetylene-containing off-gas, the term "off-gas" defining that gas which results from and is formed by pyrolysis of a gas (hereafter called "in-gas") being or containing a suitable hydrocarbon stock, and recovering the acetylene thus produced by an efficient low pressure-low temperature system.

It is another object of the invention to provide an improved process for producing an off-gas containing acetylene from a suitable hydrocarbon stock in-gas, in which a relatively high conversion to acetylene is realized, and to economically recover acetylene from the off-gas stream wherein the volume percent of acetylene is relatively low.

Still another object is to provide an improved integrated process for producing acetylene-containing gases from methane and the like wherein the overall conversion of carbon in methane to carbon in acetylene is increased, and wherein plant investment costs in the recovery system are relatively small because of the relatively low pressure and other features of the recovery system.

These and other objects and advantages of this invention will be apparent from the following description and accompanying drawings in which.

Increased conversion of suitable hydrocarbon stocks to acetylene is aided when the acetylene produced has a low partial pressure. It was also known to obtain this low partial pressure by diluting the hydrocarbon stock with materials such as steam and hydrogen. Steam appears to be the preferred diluent in prior regenerative cracking processes, and the prior art has indicated that the presence of hydrogen is harmful since it appeared to inhibit the cracking reaction. In striking contrast, the present process requires hydrogen diluent, and employs hydrogen dilution limits which unexpectedly permit the obtainance of relatively high acetylene conversion ratios making this particular pyrolysis system commercially attractive. The use of hydrogen diluent in the preferred dilution ration herein described results in a much lower percentage of carbon oxides in the off-gas. This in turn simplifies the subsequent acetylene separation and recovery step by using a relatively low pressure-low temperature system rather than a high pressure one.

According to the present invention, a process of producing acetylene from an in-gas containing a suitable hydrocarbon stock is provided in which in-gas containing hydrogen and the hydrocarbon stock in a molar ratio of between about 1 to 8 moles of hydrogen for each carbon atom of the hydrocarbon molecule is passed through a heat transfer zone which has been heated to a sutiable reaction tempearture. The in-gas is reacted in such zone so as to convert at least a portion thereof to acetylene, and the resulting acetylene-containing off-gas is discharged from the heated reaction zone. The hot off-gas is then progressively cooled to a relatively low temperature to remove condensable impurities therefrom. The reaction contact time, which is the period during which the hydrocarbon is at reaction temperature, is preferably between about 0.01 to 0.05 second for maximum yields of acetylene when the optimum reaction temperature for the particular feed stock is used. Conversion or reaction times shorter than this range result in incomplete cracking while reaction times longer than such range result in the decomposition of acetylene.

Some higher acetylene impurities are removed in a separate step, while the purified acetylene gas stream is contacted with a solvent which selectively absorbs acetylene and thereby separates the acetylene from less soluble impurities contained therein. Acetylene is then recovered from the solvent. The cooling may be conveniently carried out by passing the acetylene gas stream in countercurrent heat exchange through one or more self-cleaning heat exchange zones. Such heat exchange zones may be provided, for example, by reversing heat exchangers or regenerative heat exchangers. Pebble bed regenerative heat exchangers are preferred.

Preferentially, the process of this invention employs the steps of pyrolyzing in a "two-stroke" cycle the hydrocarbon stock by employing a ratio of hydrogen moles for each carbon atom of the hydrocarbon molecule of between 2 and 4 when at least most of the hydrocarbon in the in-gas contains less than about 7 carbon atoms, and of between about 3 and 6 when at least most of the hydrocarbon in the in-gas contains at least about 8 carbon atoms; cooling the off-gas streams, containing acetylene and other materials, to room temperature, preferably in a creeping pebble bed regenerator, to remove carbon and tars; passing the cooled gases through a blower to increase the pressure to slightly above atmospheric; cooling the gases to a relatively low temperature, preferably in another creeping pebble bed regenerator, to remove condensable materials; passing the cold gases through an adsorption trap to remove final amounts of condensable materials and some higher acetylenes; passing the cleaned, acetylene-containing gases through a cold solvent adsorption system to dissolve acetylene; passing the solution through a stripping column to remove materials less soluble than acetylene; then separating the acetylene from the solvent.

It should be understood that various operating cycles may be employed in the pyrolysis of hydrocarbon stock. The following description pertains primarily to a "two-stroke" cycle which is a preferred embodiment of this invention. The in-gas is directed through passages of a heated first regenerative mass as a reaction stroke in which at least part of such gas is converted to acetylene. The acetylene-containing reacted gas is discharged therefrom as a valuable off-gas and quenched by flow through passages of a second relatively cool regenerative mass to cool such gas to a temperature at which relatively little acetylene decomposition occurs. The second mass is simultaneously reheated by such cooling of the off-gas. The first and second regenerative masses are then conveniently returned to proper operating conditions by first terminating the flow of in-gas. A stream of oxidant gas is then introduced into the outlet of the second regenerative mass in a direction countercurrent to the previous flow of off-gas. As the oxidant flows through the passages of the second regenerative mass, it is heated and the mass is simultaneously cooled. A combustible fuel is provided and burned with at least part of the preheated oxidant gas to form a hot combustion gas mixture, the relative quantities of combustible fuel and oxidant gas being such that an excess of unreacted oxidant gas remains after the combustion. The hot combustion gas mixture and unreacted oxidant gas are then directed through passages of the cooled first regenerative mass so as to reheat such mass for subsequent reaction therein of countercurrently flowing in-gas. The first mass is further regenerated by burning off carbon deposited in the passages during the previous reaction stroke, the burnoff being effected by the unreacted oxidant gas.

To obtain continuous acetylene production, a further preferred embodiment of the invention utilizes a pair of units. The first unit contains the first and second regenerative masses while the second unit contains third and fourth regenerative masses. The fluid flows between the first and second regenerative masses, and the third and fourth regenerative masses are periodically reversed so that the third and fourth masses are placed on reaction stroke with the in-gas flowing through the passages of the fourth mass for reaction therein and the resulting off-gas flowing through the third mass passages for quenching therein. During this period, the first and second masses are on regenerative stroke with the oxidant gas flowing through the second regenerative mass passages for preheating therein, and the hot combustion gas mixture and unreacted oxidant gas flowing through the first regenerative mass passages for heating and regeneration of such mass.

Figure 1:
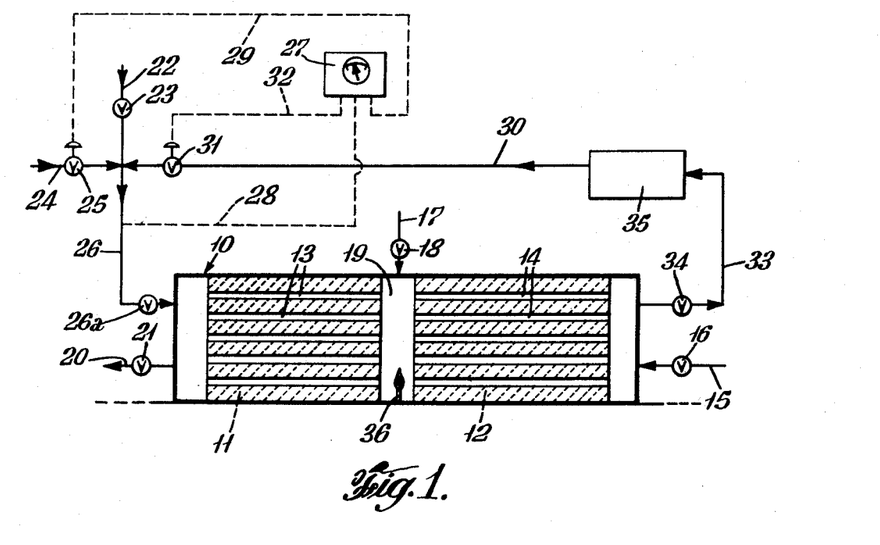
FIG. 1 is a schematic view of a two-section regenerative furnace suitable for performing the pyrolysis of hydrocarbon stock.

Referring now specifically to FIG. 1, the regenerative furnace indicated generally at 10 comprises two regenerative masses 11 and 12 constructed and arranged in a series relationship. The first and second masses 11 and 12 each contain a set of passages 13 and 14, respectively, extending therethrough from end to end. The construction of such furnaces will be well understood by those skilled in the art, and any refractory materials that can withstand the reaction conditions may be used. Although we prefer to use alumina molded with the passages in place, other materials and arrangements such as stacked tiles of silicon carbide and the like would also be suitable. A packed pebble bed can also be used if desired with the voids comprising the aforementioned passages.

The process of the present invention is initiated by introducing an oxidant gas, such as air, in conduit 15 and passing such gas through control valve 16 therein to second regenerative mass passages 14 for flow therethrough to a combustion chamber 19 separating the two regenerative masses 11 and 12. During flow through passages 14, the air stream is preheated by abstracting heat stored in second mass 12 during countercurrent flow of the hot off-gas from the previous in-gas stroke, as will be described later in more detail. A stream of combustible fuel such as hydrogen, methane, ethane, or a mixture thereof, is provided in conduit 17 and directed through control valve 18 into combustion chamber 19 for mixing with the preheated air stream. The gas mixture is spontaneously ignited in chamber 19 due to the high temperature of the oxidant. However, a convenient ignition source such as pilot flame 36 may be used if necessary or desirable.

The hot combustion gas mixture formed in chamber 19 is passed therefrom through first regenerative mass passages 13 so as to reheat mass 11 to a suitable reaction temperature for subsequent processing of the in-gas to be cracked. The cooled combustion gas mixture is discharged from the end of passages 13 into conduit 20 and control valve 21 therein for venting to the atmosphere or further processing as desired. The preferred in-gas reaction temperature depends to a certain extent on the type of hydrocarbon stock available. For example, a reaction temperature of about 2700° F. to 2800° F. is preferred for methane, whereas lower temperatures are most suitable for higher molecular weight hydrocarbons.

An additional preferred feature of the aforedescribed regenerative stroke is removal of the carbon deposited in the first regenerative mass passages 13 during cracking of the hydrocarbon stock containing in-gas. This is accomplished by providing the oxidant gas in a quantity which is in excess of that required to burn the combustible fuel in chamber 19, so that the hot combustion gas entering first regenerative mass passages 13 contains a portion of unreacted oxidant. The latter oxidizes and burns out the carbon from such passages, and the carbon oxides-containing gas is discharged therefrom as part of the cooled combustion gas mixture. The flow of oxidant gas must be such that proper heat balances are obtained in both regenerative masses 11 and 12 of the furnace to provide efficient reaction and quenching temperatures.

A suitable hydrocarbon feed stock is then introduced through conduit 22 and control valve 23, and is mixed with a hydrogen-containing gas stream which is introduced through branch conduit 24 and control valve 25 therein. The resulting in-gas mixture is directed through conduit 26 and control valve 26a therein into passages 13 of the preheated first regenerative mass 11 for cracking therein. As previously discussed, the flow ratio between the hydrocarbon feed and the hydrogen containing gas is a critical part of the invention, and the preferred ratio varies depending on the hydrocarbon feed supplied. It therefore is desirable to provide a method for monitoring and adjusting the ratio at will. To this end, analyzer and proportional flow controller 27 is supplied to monitor the hydrogen-hydrocarbon ratio in conduit 26, tap conduit 28 providing the necessary communicating means. Signals are then sent from analyzer-controller 27 through conduit 29 to valve 25 for automatic control thereof.

During the start-up and initial operating period, it is necessary to supply at least most of the hydrogen required to form the in-gas as fresh hydrogen gas through conduit 24 and automatic control valve 25 as previously described. However, as soon as normal operating conditions are attained, hydrogen will be available from the acetylene separation system in which product acetylene is separated from the off-gas. When this condition is realized, hydrogen gas is preferably recycled from the acetylene separation system through branch conduit 30 and control valve 31 therein to conduit 26 so as to provide at least part of the makeup hydrogen required for the in-gas. The quantity of recycle hydrogen is regulated to provide the desired hydrogen-hydrocarbon feed ratio, as previously described, and such regulation is preferably effected by means of analyzer and proportional flow controller 27 which, for example, may control the setting of automatic valve 31 by intercommunicating conduit 32. It is to be understood that if hydrogen-containing gas is to be simultaneously supplied to conduit 26 through conduits 24 and 30, it may be desirable to provide a second analyzer and proportional flow controller similar to controller 27. Such controllers would be constructed and operated in a manner well known to those skilled in the art.

Returning now to the in-gas in conduit 26, such gas is passed into first regenerative passages 13 which have previously been purged of deposited carbon and heated to the desired reaction temperature. The in-gas is partially converted to acetylene in such passages. One advantage of the present process is that the reaction step is most efficiently performed at pressures of less than 2 atmospheres, and preferably at a pressure of 1 to 2 atmospheres. In the prior art regenerative cracking processes it was necessary to operate at subatmospheric pressures to improve conversions, but the acetylene conversion efficiency of the present invention is sufficiently high so that reduced pressure operation is usually not necessary, thus effecting a substantial saving in equipment costs. The only possible advantage of operating at a subatmospheric pressure in the present process is to increase the concentration of acetylene in the off-gas and thus facilitate easier acetylene separation or recovery. This advantage must be weighed economically against the additional cost of equipment to produce the reduced pressure.

Since the acetylene will in turn decompose if maintained for a relatively long period at the reaction temperature, the in-gas contact time in the hot passages 13 is preferably closely regulated between about 0.01 and 0.05 second when the optimum reaction temperature for the particular feed stock is used. This range has been found to provide an optimum balance between maximum hydrocarbon stock conversion and minimum acetylene decomposition. Such control may be accomplished, for example, by appropriate adjustment of the in-gas flow rate. During the acetylene conversion, elemental carbon is deposited in such passages. The resulting acetylene-containing reacted gas is discharged from the opposite end of partially cooled passages 13 into combustion chamber 19 as off-gas, and hence into the communicating end of relatively cool second regenerative mass passages 14 for rapid quenching therein to below 1000° F. In this manner, acetylene decomposition is further minimized. The cooled off-gas is discharged from the partially rewarmed passages 14 into conduit 33 for flow through control valve 34 therein and is then passed to the acetylene separation and recovery system indicated generally as item 35. The recycle stream consists mainly of hydrogen but also contains unreacted hydrocarbon stock, especially when methane is used as the feed stock. The recycle stream is returned to furnace 10 through conduits 30 and 26, as previously described. When the hydrocarbon feed stock contains a substantial quantity of methane, the recycling of unreacted methane to the in-gas stream in combination with the preferred hydrogen moles to carbon atom ratio of between about 2 and 4 has enabled the present process to provide the highest known conversions of methane to acetylene. This is a decided commercial advantage since methane is a readily available raw material.

Figure 2:
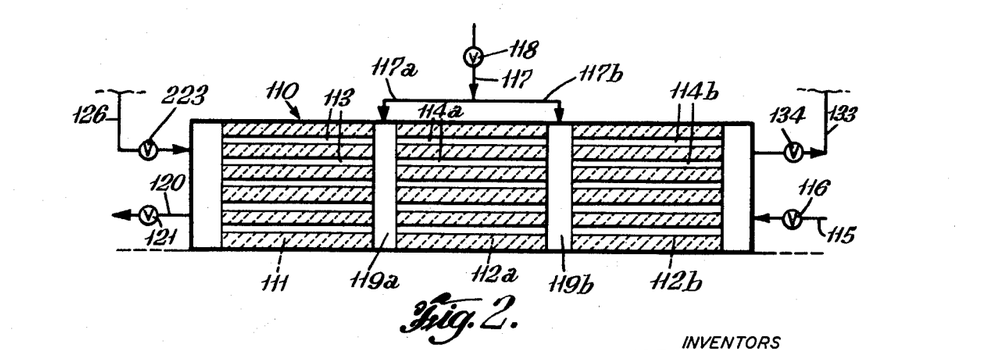
FIG. 2 is a schematic view of a three-section regenerative furnace also suitable for performing the pyrolysis of hydrocarbon stock.

FIG. 2 illustrates a three-section regenerative furnace which constitutes the preferred means of performing the pyrolysis of the acetylene-containing hydrocarbon. Three regenerative masses 111, 112a and 112b are provided with passages 113, 114a and 114b, respectively, and the combustible fuel stream in conduit 117 is passed through branch conduits 117a and 117b to combustion chambers 119a and 119b, respectively. Combustion chamber 119a separates regenerative mass 111 from one end of mass 112a, and combustion chamber 119b separates the opposite end of regenerative mass 112a from mass 112b. During the regenerative stroke, oxidant gas is introduced through conduit 115 into warm passages 114b for preheating, and is then mixed with fuel in combustion chambers 119a and 119b for burning therein to form a hot combustion gas mixture. The hot combustion gas, which preferably contains a portion of unreacted oxidant, then flows through passages 114a and 113 so as to simultaneously reheat regenerative masses 111 and 112a to the desired reaction temperature and remove the previously deposited carbon. During the reaction stroke, in-gas flows through conduit 126 into passages 113 and 114a for partial conversion to acetylene therein, the resulting off-gas passing through passages 114b for quenching. The cooled off-gas is discharged from the furnace 110 through conduit 133 and control valve 134 therein for passage to the acetylene recovery system (not shown).

One important advantage of the FIG. 2 three-section furnace as compared to the two-section furnace of FIG. 1, is that complete combustion of the oxidant and fuel on the regenerating portion of the cycle can take place over a greater passage length and thus avoid the formation of excessive hot spots in the reaction zone which reduce the overall efficiency of the process.

Figure 3:
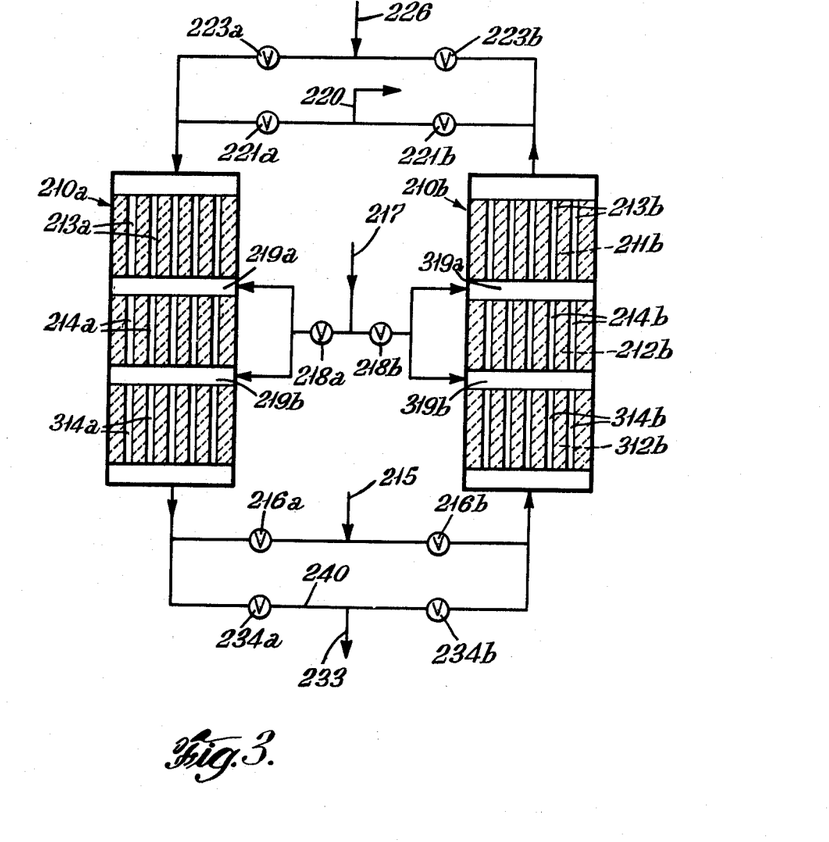
FIG. 3 is a schematic view of a pair of the three-section regenerative furnaces of FIG. 2 connected to operate in alternate sequence, so that while one unit is on a reaction stroke, the other unit is on a regenerative stroke.

The furnaces illustrated in FIGS. 1 and 2 operate on an intermittent basis; that is, first on reaction stroke and then on regenerative stroke. Consequently, such furnaces do not provide a continuous supply of acetylene-containing off-gas, which may be desirable when the subsequent recovery step is also performed on alternate strokes basis. FIG. 3 illustrates a system providing a continuous supply of off-gas, in which two furnaces 210a and 210b are piped in parallel so that when one furnace is on the reaction stroke the other furnace is on the regenerative stroke. Each furnace as illustrated has three sections and operates in substantially the same manner as the furnace illustrated in FIG. 2. It is to be understood, however, that each furnace may be provided with any other desired number of sections, for example, two sections as shown in the FIG. 1 embodiment.

Referring more specifically to FIG. 3, at the illustrated moment in the operating sequence, furnace 210a is processing in-gas and furnace 210b is being regenerated. The in-gas is introduced in conduit 226 and passed through reversing valve 223a to furnace 210a for consecutive flow through passages 213a, combustion chamber 219a, passages 214a, combustion chamber 219b, and passages 314a. The resulting cooled acetylene-containing off-gas is discharged from passages 314a through conduit 240 and reversing valve 234a therein to conduit 233 for passage to the acetylene recovery system (not shown). Simultaneously, an oxidant stream is introduced through conduit 215 for flow through reversing valve 216b to furnace 210b and through passages 314b where it is preheated. Combustion fuel gas is introduced through conduit 217 and reversing valve 218b to combustion chambers 319a and 319b where it mixes with preheated oxidant and burns. The resulting hot combustion gases flow through passages 214b and 213b where they transfer their heat to the regenerative masses 212b and 211b, respectively. The resulting cooled combustion gas mixture is discharged from furnace 210b through reversing valve 221b and conduit 220 for release to the atmosphere or further treatment as desired.

At periodic intervals, for example, when the temperature in the cracking sections of the furnaces drops below effective cracking level, the flows between furnaces 210a and 210b are reversed. Thus, the in-gas flows to furnace 210b through conduit 226 and reversing valve 223b, and emerges from passages 314b through conduit 240 and reversing valve 234b therein. During this period, the oxidant gas flows through conduit 215 and reversing valve 216a therein to furnace 210a. The cooled combustion gas mixture formed therein is discharged from passages 213a through conduit 220 and reversing valve 221a therein.

Figure 4:
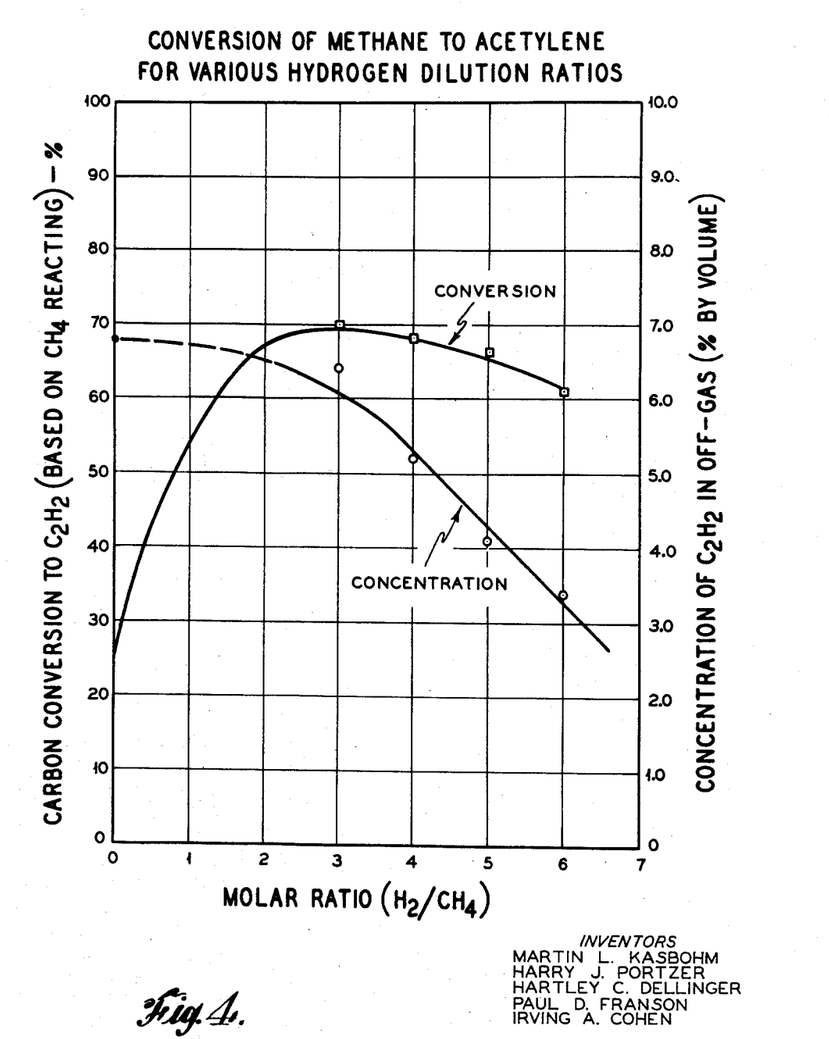
FIG. 4 is a graph showing the conversion of methane to acetylene for various hydrogen dilution ratios obtainable by the present process.

FIG. 4 is a graph illustrating the results of a substantial number of tests in which methane was partially converted to acetylene by the pyrolytic cracking step of the present invention, using the apparatus shown by FIG. 1. Various hydrogen dilution ratios were used, and the graph clearly shows the criticality of such ratios with respect to acetylene conversion and concentration in the off-gas. It is significant to note that the acetylene conversion percentage passes through a peak betwen molar ratios of 2 and 4, which is the preferred ratio range for hydrocarbon stocks containing less than about seven carbon atoms.

Figure 5:
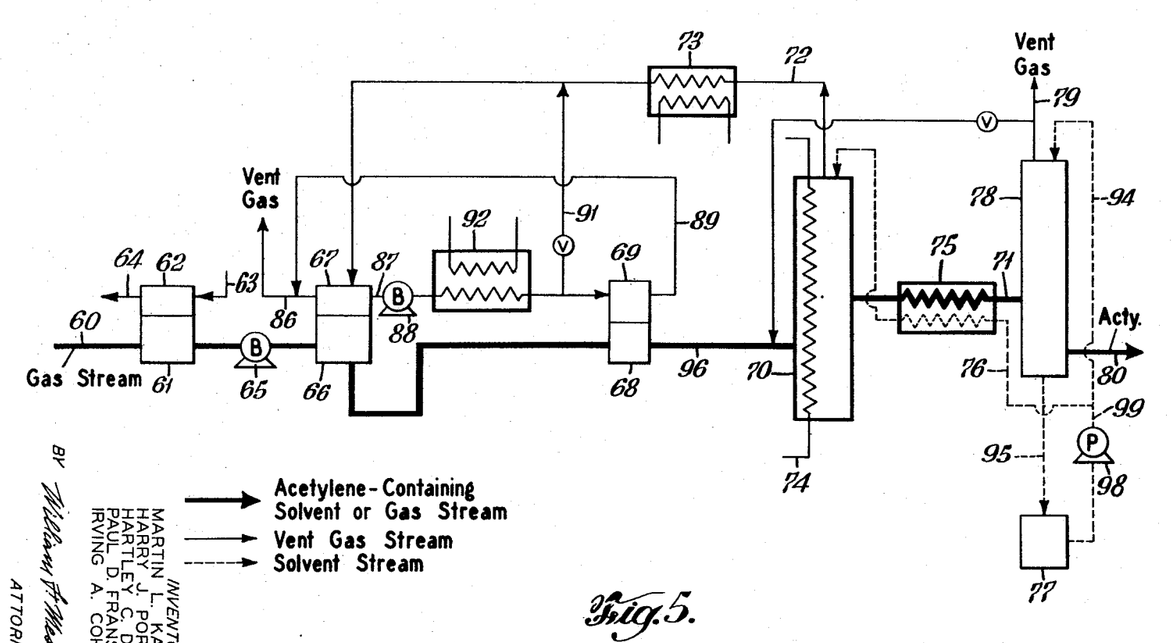
FIG. 5 is a diagrammatic representation or flow diagram of one embodiment of the acetylene recovery system portion of this invention.

Referring more specifically to FIG. 5, the acetylene-containing product off-gas is introduced from conduit 33 of FIG. 1 into the recovery apparatus through line 60. This gas stream, coming from the preceding hydrocarbon pyrolytic cracking process, is cooled to about room temperature by heat exchange with a process gas stream, such as air, in creeping pebble bed regenerative exchanger 61. The creeping pebble bed regenerators are operated in a pair with one exchanger 62 being cooled by exchange with process gas from line 63 while the other exchanger 61 is cooling the off-gas stream. These regenerators also serve to clean carbon and tars from the off-gas stream. Regenerators 61 and 62 are called "hot" regenerators since they operate at room temperature and above.

The construction and operation of the creeping pebble bed regenerators preferably employed in the process of this invention are described in more detail in copending application Serial No. 776,549, filed November 26, 1958, now U.S. Patent No. 3,092,836.

The hot regenerator is preferably operated in such fashion that the temperature of the pebbles at the hot end (gas inlet) is high enough to burn off or vaporize carbonaceous materials which have been deposited on the pebbles. There is also a slow moving of the pebbles through the regenerator from the cold end to the warm end. In this fashion material deposited on the pebbles in the cooler region of the regenerator is slowly moved toward the warm end where it will be either vaporized and removed by the purge gas stream or burned off to provide self-cleaning operation. A separate burner could alternatively be used to burn off pebble deposits. The cold end (gas outlet) is kept as cool as possible to lower power requirements of a subsequent blower 65 and to condense as much as possible of the contaminants from the gas stream. This desired cold end condition is obtained by using sufficient process gas or air on the regenerative cycle so that the outlet temperature of the off-gas is approximately the same as the inlet temperature of the process gas or air. The warm purge gas from the hot regenerator in line 64 may then be used in any desired way or discarded. If air is used for heat exchange, the resulting warm process air could be used in the combustion cycle of the preceding regenerative cracking furnace to maintain proper heat balance in the furnace or as oxidant for a partial oxidation burner.

While the slow movement of pebbles in the hot regenerator from cold to warm end is preferable in most cases, situations where the quantity of condensed materials is sufficiently large to disrupt pebble flow may best be handled by flow of pebbles in the opposite direction from warm to cold end. In this situation the pebbles would not be internally self-cleaned, but the outlet gas will still be clean due to condensation of most contaminants on the cold pebbles. The pebbles may then be cleaned externally to the regenerator by treatment in a furnace to vaporize or burn off carbonaceous deposits.

While the preferred process modification is to use the creeping bed regenerators to cool the acetylene-containing off-gas stream to about room temperature, it should be understood that other means, such as water towers or other types of heat exchangers, could also be used to achieve the same result and still be within the limits of our invention.

The cooled off-gas stream from the pebble bed regenerator at about room temperature and atmospheric pressure is then compressed to a pressure less than about 3 atmospheres absolute in blower 65 and passed preferably into a set of creeping pebble-bed cold regenerators 66 and 67 operated cyclically in a pair, where the off-gas stream is cooled to about —120° C. to —160° C. These regenerators are called "cold" regenerators because they operate below room temperature. These cold regenerators are similar in construction and operation to the hot regenerators described hereinabove. The use of such regenerators with their low cost heat exchange surface permits a high thermal efficiency in the recovery of refrigeration and provides a self-cleaning heat exchange system for continuous operation. The minimum operating temperature is determined by the point at which acetylene begins to condense. This point would be determined by the pressure used in this stage. The optimum cold end temperature is determined by an economic balance between equipment investment and operating costs. In these cold regenerators heat exchange is obtained between the off-gas stream and vent gas from the subsequent separation system. This cooling of the gas also removes heat of compression introduced by blower 65. These regenerators can further clean the gas stream by freezing out additional condensable material, such as diacetylene, if this is desired.

In one embodiment of the present process, the temperature of the off-gases at the outlet of the cold regenerator is kept in the range of —150° F. to —160° F., at 10 pounds per square inch gauge pressure to freeze out substantially all of the diacetylene. Since the temperature of the cold gas entering the heat exchanger is fixed by the operating conditions of the separation cycle, the control of the outlet temperature of the gases from the cold regenerator is accomplished by varying the rate of pebble flow from the cool end to the warm end of the regenerator. With respect to the total heat exchange, the flow of pebbles adds to the flow of cold vent gas to give a control over the overall flow of cold heat exchange material. When a subsequent step, such as an adsorbent bed, is used to remove substantially all of the higher acetylene, such as diacetylene, the cold regenerators can be operated at —120° F. to —130° F. at the outlet end.

While the preferred process modification is to use the creeping bed regenerators to cool the gas stream from room temperature to a relatively cold temperature, it should be understood that other types of heat exchangers could be used and still be within the scope of this invention. If reversing heat exchangers were used, pressures up to about 3 atmospheres absolute might be necessary in order to obtain "self-cleaning" action. In this case the minimum operation temperature would be about —150° F. in order to prevent condensation of acetylene.

FIG. 5 shows passage of acetylene-containing off-gas (intake stroke) through regenerator 61, blower 65 and regenerator 66 while regenerators 62 and 67 are being purged with process gas or air and recycled vent gas from the acetlyene adsorber 70. It is understood that the intake and purge strokes are periodically reversed so that the acetylene-containing gas passes through regenerator 62, blower 65 and regenerator 67, while regenerators 61 and 66 are being purged. Means for providing this alternation of intake and purge strokes is well known to those skilled in the art.

For final cleanup, the off-gas stream may be passed through a cold adsorbent trap 68 maintained at a temperature below about 32° F. to remove the last traces of diacetylene and some other higher acetylenes, such as methyl acetylene and vinyl acetylene. Some olefins such as allene are also removed. The trap is preferably maintained at a temperature below −40° F. and specifically at a temperature near that of the cold regenerator outlet temperature. Low temperatures are used in order to increase adsorptive capacity and also to prevent polymerization of the adsorbed impurities. Silica gel is a convenient adsorbent, but other known adsorbents such as activated alumina or activated charcoal can be used as well. A companion adsorbent trap 69 may also be used for continuous operation. One trap is regenerated by means of a cold vent gas stream, while the other is adsorbing. In the preferred form of this invention the adsorbent trap is designed to remove all the higher acetylenes, especially diacetylene. This bed can be reused since the adsorbed higher acetylenes do not polymerize and foul the adsorbent under the low temperature adsorption conditions used.

The cleaned gas from the cold adsorbent trap 68 then passes through linee 96 to the main absorber column 70 where cold solvent at a temperature below about −120° F. and a pressure of less than about 2 atmospheres absolute enters through line 76 and removes the acetylene and other soluble constituents. Typical operation is at about −139° F. and 6 p.s.i.g. Efficient liquid-gas contact in the absorber column is obtained by means of packing or trays. The acetylene is absorbed in the main section of the column 70 and goes out with the main solvent stream 71. The stripped vent gas stream from the top of the column 70 is recycled through line 72 to regenerator 67 to pick up material adsorbed and condensed on the pebbles during the intake stroke and to recover the refrigeration in the stream. The vent gas in line 72 recycled to regenerator 67 is then divided inside the regenerator in order to maintain proper internal heat balance. The main portion of the gas passes through regenerator 67 and leaves through line 86. The remaining portion leaves regenerator 67 through line 87, passes through blower 88 and heat exchanger 92, and forms the cooling purge gas for adsorbent bed 69. The resulting purge gas returns to the main vent gas stream 86 through line 89. Proper heat balance conditions are maintained by line 91 and heat exchanger 92. An optional heat exchanger 73 may need to be interposed in line 72 to help balance the heat capacity of the gas streams in regenerators 66 and 67. This recycled gas in line 86 may then be added to the hydrocarbon stock prior to the cracking process if so desired.

Heat of absorption is removed from the main absorber column 70 by means of a refrigeration coil 74. Acetone is the preferred solvent for this absorption step since it has high selectivity for acetylene at these low temperatures, although other solvents such as ammonia, dimethyl formamide, N-methyl-2-pyrolidone and 3-butyrolactone may be used.

The main solvent stream 71 containing the acetylene in solution exchanges heat in heat exchanger 75 with the stripped solvent stream returning from the solvent storage container 77 through pump 98, line 99 and line 76. The acetylene-rich solvent stream 71 is then preferably fed to a combination vent column and acetylene stripper 78. For purpose of clarity, this stripper 78 may be divided into three sections. In the upper section, between the feed point of line 71 and the top of the column, a small stream of solvent 94 is employed to scrub acetylene from the vent gases rising through the stripper, thus providing a vent gas stream rich in components less soluble than acetylene, such as carbon dioxide, hydrogen, methane and carbon monoxide. This vent gas stream is taken off overhead through line 79. In the middle section of the stripper 78, between the feed point of line 71 and the acetylene discharge line 80, the descending solvent stream is stripped of components less soluble than acetylene by a stream of gaseous acetylene (not shown) formed in the bottom section of the stripper. In the bottom section of the stripper 78, below the acetylene discharge line 80, the descending solvent stream is stripped of acetylene by solvent vapor (not shown) generated by boiling the stripped solvent at the bottom of the column with a steam-heated heat exchanger (also not shown). The overall operation in column 78 is temperature-driven. The vent gas is obtained by a combination of temperature increase and purging by acetylene gas which, in turn, is obtained by purging of solvent vapor. The solvent vapor is also obtained by a temperature increase.

The small stream of solvent 94 introduced in the upper section of the column is obtained from solvent storage 77 through pump 98 and line 99 and constitutes a portion of the stripped solvent stream, the rest of it being diverted through line 76. The vent gas taken off overhead through line 79 may be recycled to the main gas stream to recover its acetylene content or it may be vented if desired.

Alternatively, two separate columns, a vent column and a stripper column, may be employed. The combined vent column and acetylene stripper, described hereinabove, is, however, preferred.

An acetylene stream having a purity of about 99.5 percent is taken off as a sidestream from the vent column and acetylene stripper 78 through line 80 and forms the desired product stream. The stripped solvent from the bottom of this column is then returned to the solvent storage 77 through line 95 for reuse. It is understood that various engineering variations could be used to strip the acetylene from the main solvent stream leaving absorber 70. The above-detailed process is the one presently preferred.

Figure 6:
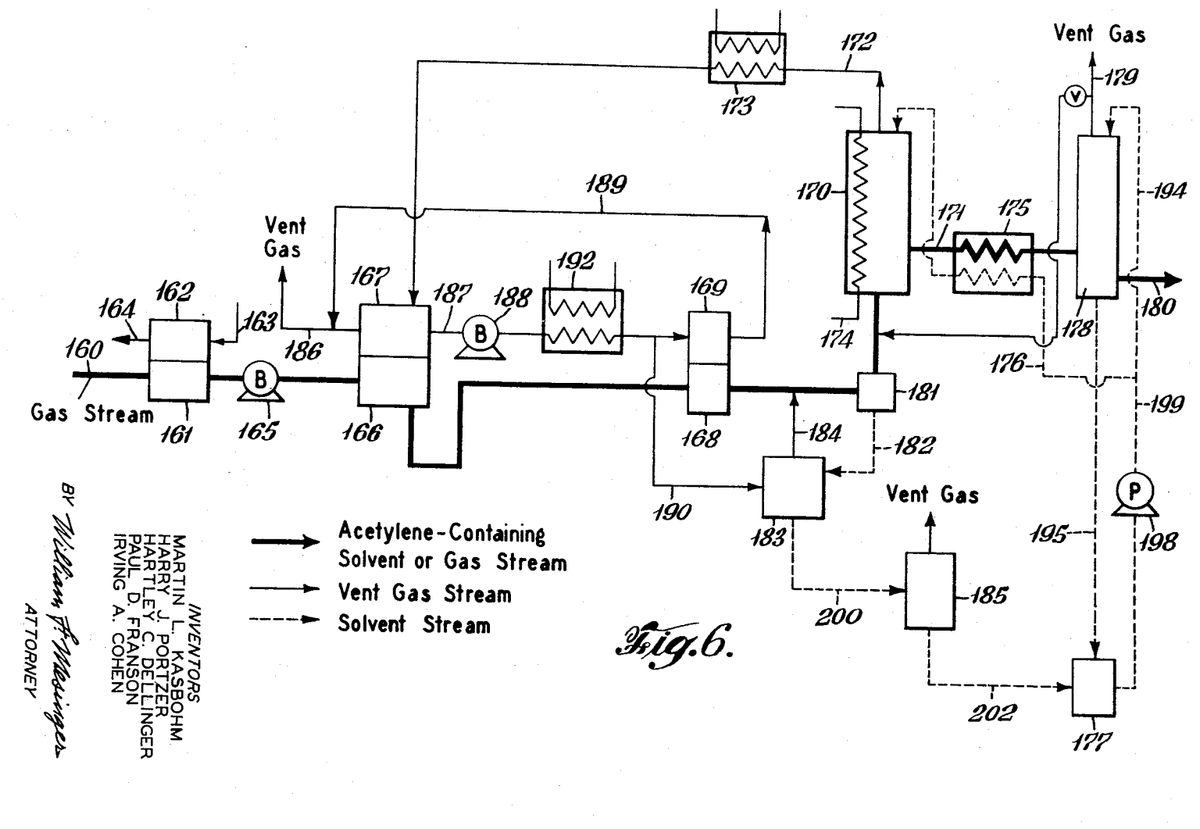
FIG. 6 is a diagrammatic representation of a second embodiment of the acetylene recovery system of this invention.

In another embodiment of the invention, shown in FIG. 6, the adsorbent bed 168 may be designed to remove only diacetylene and not other higher acetylenes such as methyl acetylene. The methyl acetylene, which is generally more soluble in appropriate solvents than is acetylene, is then selectively absorbed in the bottom section 181 of the absorber 170 and is taken off in a bottom stream through line 182. This stream 182 containing methyl acetylene, solvent and a small amount of acetylene is purged of substantially all of its acetylene content in an acetylene recovery column 183. A portion of the vent gas from absorber 170 in line 190 is used to purge this column, and then this gas returns with its acetylene content to absorber 170 through line 184. The solvent and methyl acetylene from the bottom of column 183 are then passed through line 200 to a stripper column 185 for separation. The resulting stripped solvent is returned to solvent storage 177 through line 202.

This relatively low pressure, low temperature separation system reduces the large investment required in the usual separation systems for recovery of low concentrations of acetylene from cracked gases. It eliminates the large number of compressors required by prior art recovery methods which operated at higher pressures since it only needs a relatively low pressure compressor to force the cracked gases through the separation cycle into the preferred form of the invention. The use of low temperature solvent absorption at a relatively low pressure requires smaller amounts of solvent due to increased solubility of acetylene at the low temperature. The use of creeping bed regenerators provides a novel and convenient method for cleaning the cracked gas stream while also permitting low pressure, low temperature processing without excessive heat exchange costs. This improved process is especially useful for removing acetylene present in gas streams in low concentrations.

The adsorption bed for removal of higher acetylenes is novel and preferred in that it eliminates the necessity for separate solvent towers to recover these impurities. Such towers are large and expensive since they must handle the entire acetylene-containing gas stream as well as the solvent. Low temperature adsorption is unique in that the beds can be resued since the adsorbed higher acetylenes do not polymerize at the operating conditions. The preferential removal of higher acetylenes by adsorption was also unexpected and has proved to be a useful feature of this invention.

What is claimed is:

1. A process of producing acetylene from an in-gas containing a suitable hydrocarbon stock which comprises the steps of passing an in-gas containing hydrogen and said hydrocarbon stock in a molar ratio of between about 1 to 8 moles of hydrogen for each carbon atom of the hydrocarbon molecule through a heat transfer zone which has been heated to a suitable reaction temperature to form a heated reaction zone; reacting said in-gas in said heated reaction zone so as to convert at least part of said in-gas to acetylene; discharging the acetylene-containing off-gas from said heated reaction zone; cooling said off-gas to a temperature below about −120° F. at a pressure below about 3 atmospheres absolute to remove condensable materials; contacting the cold gas stream with an adsorbent at a temperature below 32° F. to remove final amounts of condensable materials and at least some amounts of higher acetylenes and discharging the resultant gas stream from the adsorbent at a temperature below 32° F. so as to substantially prevent polymerization of the hydrocarbon impurities adsorbed therein; contacting the resultant gas stream at a temperature below about −120° F. and a pressure below about 2 atmospheres absolute with a solvent wherein said acetylene is selectively dissolved to separate said acetylene from said non-condensable materials; and recovering said acetylene from said solvent.

2. A process for producing acetylene from an in-gas containing a suitable hydrocarbon stock which comprises the steps of passing an in-gas containing hydrogen and said hydrocarbon stock in a molar ratio of between about 1 to 8 moles of hydrogen for each carbon atom of the hydrocarbon molecule through a heat transfer zone which has been heated to a suitable reaction temperature to form a heated reaction zone; reacting said in-gas in said heated reaction zone for a period of between about 0.01 and 0.05 second and at a pressure of between about 1 and 2 atmospheres absolute so as to convert at least part of such in-gas to acetylene; discharging the acetylene-containing off-gas from said heated reaction zone; progressively cooling said off-gas stream to a temperature of about −120° F. to −160° F. under pressures of less than about 3 atmospheres absolute to remove a substantial portion of the condensable materials contained therein; contacting the cold gas stream with an adsorbent at a temperature below 32° F. to remove final amounts of condensable materials and at least some amounts of higher acetylenes and discharging the resultant gas stream from the adsorbent at a temperature below 32° F. so as to substantially prevent polymerization of the hydrocarbon impurities adsorbed therein; contacting the resultant partially purified gas stream at a temperature below about −120° F. and a pressure of less than about 2 atmospheres absolute with a solvent wherein the acetylene is selectively dissolved to separate said acetylene from some of the less soluble impurities and from most of the substantially insoluble non-condensable materials in the gas stream; venting the remaining reductively less soluble impurities from the solvent; and recovering the acetylene from said solvent.

3. A process of producing acetylene from an in-gas containing a suitable hydrocarbon stock which comprises the steps of passing an in-gas containing hydrogen and said hydrocarbon stock in a molar ratio of between about 2 to 6 moles of hydrogen for each carbon atom of the hydrocarbon molecule through a heat transfer zone which has been heated to a suitable reaction temperature to form a heated reaction zone; reacting said in-gas in said heated reaction zone for a period of between about 0.01 and 0.05 second and at a pressure of between about 1 and 2 atmospheres absolute so as to convert at least part of such in-gas to acetylene; discharging the acetylene-containing off-gas from said heated reaction zone; progressively cooling said off-gas stream to a temperature of about −120° F. to −160° F. under pressures of less than about 3 atmospheres absolute to remove a substantial portion of the condensable materials contained therein; contacting the cold gas stream with an adsorbent at a temperature below 32° F. to remove final amounts of condensable materials and at least some amounts of higher acetylenes and discharging the resultant gas stream from the adsorbent at a temperature below 32° F. so as to substantially prevent polymerization of the hydrocarbon impurities adsorbed therein; contacting the resultant partially purified gas stream at a temeprature below about −120° F. and a pressure of less than about 2 atmospheres absolute with a solvent wherein the acetylene is selectively dissolved to separate said acetylene from some of the less soluble impurities and from most of the substantially insoluble non-condensable materials in the gas stream; venting the remaining reductively less soluble impurities from the solvent; and recovering the acetylene from said solvent.

4. A process of producing acetylene from an in-gas containing a suitable hydrocarbon stock which comprises the steps of passing an in-gas containing hydrogen and said hydrocarbon stock in a molar ratio of between about 1 to 8 moles of hydrogen for each carbon atom of the hydrocarbon molecule through a heat transfer zone which has been heated to a suitable reaction temperature to form a heated reaction zone; reacting said in-gas in said heated reaction zone for a period of between about 0.01 and 0.05 second and at a pressure of between about 1 and 2 atmospheres absolute so as to convert at least part of such in-gas to acetylene; discharging the acetylene-containing off-gas from said heated reaction zone; separating from said off-gas stream at least part of the remaining hydrogen-containing gas and recycling said hydrogen-containing gas to said heated reaction zone so as to provide at least part of the hydrogen of said in-gas; progressively cooling said off-gas stream to a temperature of about −120° F. to −160° F. under pressures of less than about 3 atmospheres absolute to remove a substantial portion of the condensable materials contained therein; contacting the cold gas stream with an adsorbent at a temperature below 32° F. to remove final amounts of condensable materials and at least some amounts of higher acetylenes and discharging the resultant gas stream from the adsorbent at a temperature below 32° F. so as to substantially prevent polymerization of the hydrocarbon impurities adsorbed therein; contacting the resultant partially purified gas stream at a temperature below about −120° F. and a pressure of less than about 2 atmospheres absolute with a solvent wherein the acetylene is selectively dissolved to separate said acetylene from some of the less soluble impurities and from most of the substantially insoluble non-condensable materials in the gas stream; venting the remaining reductively less soluble impurities from the solvent; and recovering the acetylene from said solvent.

5. A process of producing acetylene from an in-gas containing a suitable hydrocarbon stock which comprises the steps of passing an in-gas containing hydrogen and said hydrocarbon stock in a molar ratio of between about 2 to 6 moles of hydrogen for each carbon atom of the hydrocarbon molecule through a heat transfer zone which has been heated to a suitable reaction temperature to form a heated reaction zone; reacting said in-gas in said heated reaction zone for a period of between about 0.01 and 0.05 second and at a pressure of between about 1 and 2 atmospheres absolute so as to convert at least part of such in-gas to acetylene; discharging the acetylene-containing off-gas from said heated reaction zone; cooling said off-gas in a first creeping pebble bed regenerative heat exchanger to about room temperature at a pressure below about 3 atmospheres absolute in heat exchange with material selected from the class consisting of process gas and process air to remove a portion of the condensable materials contained therein; further cooling said off-gas in a second creeping pebble bed regenerative heat exchanger to about −120° F. to −130° F. at a pressure below about 3 atmospheres absolute in heat exchange with a cold vent gas stream to remove additional amounts of condensable materials; treating the acetylene-containing gas stream with an adsorbent at a temperature below −40° F. and substantially the same as the outlet temperature of said second creeping pebble bed regenerator to remove final amounts of condensable materials and substantially all of the higher acetylenes and discharging the resultant gas stream from the adsorbent at a temperature below 32° F. so as to substantially prevent polymerization of the hydrocarbon impurities adsorbed therein; contacting the resultant purified gas stream with a solvent at a temperature below about −120° F. and a pressure of less than about 2 atmospheres absolute, said solvent selectively absorbing acetylene and thereby separating the acetylene from some of the less soluble impurities and from most of the non-condensables; recycling said less soluble and non-condensable materials as said cold vent gas stream for heat exchange in said second creeping pebble bed regenerative heat exchanger; venting the remaining less soluble impurities from the solvent; and recovering the acetylene from the solvent.

6. The process in accordance with claim 5, wherein the absorbent is silica gel and the solvent is acetone.

7. A process of producing acetylene from an in-gas containing a suitable hydrocarbon stock which comprises the steps of directing a hot combustion gas mixture through passages of a first regenerative mass to heat such mass to a suitable reaction temperature; directing through said passages of the heated first regenerative mass an in-gas containing hydrogen and said hydrocarbon stock in a molar ratio of between about 1 to 8 moles of hydrogen for each carbon atom of the hydrocarbon molecule and reacting said in-gas for a period of between about 0.01 and 0.05 second and at a pressure of between about 1 and 2 atmospheres absolute in contact with such first heated regenerative mass so as to convert at least part of such in-gas to acetylene; discharging the acetylene-containing reacted gas from the first regenerative mass passages as said valuable off-gas and directing such hot gas through passages of a second relatively cool regenerative mass for quenching the off-gas to a lower temperature at which relatively little acetylene decomposition occurs; discharging the quenching off-gas from said passages in the warmed second regenerative mass, and recovering the heat abstracted by said second regenerative mass from the hot off-gas by providing an oxidant gas and directing such oxidant gas through the second regenerative mass passages; providing a combustible fuel and burning such fuel with the heated oxidant gas so as to form said hot combustion gas mixture; discharging the acetylene-containing off-gas from said heated reaction zone; progressively cooling said off-gas stream to a temperature of about −120° F. to −160° F. under pressures of less than about 3 atmospheres absolute to remove a substantial portion of the condensable materials therefrom; contacting the cold gas stream with an adsorbent at a temperature below 32° F. to remove final amounts of condensable materials and at least some amounts of higher acetylenes and discharging the resultant gas stream from the adsorbent at a temperature below 32° F. so as to substantially prevent polymerization of the hydrocarbon impurities adsorbed therein; contacting the resultant partially purified gas stream at a temperature below about −120° F. and a pressure of less than about 2 atmospheres absolute with a solvent which selectively dissolves acetylene to separate the acetylene from some of the relatively less soluble impurities and from most of the substantially insoluble non-condensable materials in the gas stream; venting the remaining reductively less soluble impurities from the solvent; and recovering the acetylene from the solvent.

8. A process of producing acetylene from an in-gas containing a suitable hydrocarbon stock which comprises the steps of directing a hot combustion gas mixture through passages of a first regenerative mass to heat such mass to a suitable reaction temperature; directing through said passages of the heated first regenerative mass an in-gas containing hydrogen and said hydrocarbon stock in a molar ratio of between about 1 to 8 moles of hydrogen for each carbon atom of the hydrocarbon molecule and reacting said in-gas for a period of between about 0.01 and 0.05 second and at a pressure of between about 1 and 2 atmospheres absolute in contact with such first heated regenerative mass so as to convert at least part of such in-gas to acetylene; discharging the acetylene-containing reacted gas from the first regenerative mass passages as said valuable off-gas and directing such hot gas through passages of a second relatively cool regenerative mass for quenching the off-gas to a lower temperature at which relatively little acetylene decomposition occurs; discharging the quenching off-gas from said passages in the warmed second regenerative mass, and recovering the heat abstracted by said second regenerative mass from the hot off-gas by providing an oxidant gas and directing such oxidant gas through the second regenerative mass passages; providing a combustible fuel and burning such fuel with the heated oxidant gas so as to form said hot combustion gas mixture; discharging the acetylene-containing off-gas from said heated reaction zone; cooling said off-gas in a first creeping pebble bed regenerative heat exchanger to about room temperature in heat exchange with material selected from the class consisting of process gas and process air to remove a portion of the condensable materials contained therein; further cooling said off-gas in a second creeping pebble bed regenerative heat exchanger to about −120° F. to −130° F. in heat exchange with a cold vent gas stream to remove additional amounts of condensable materials; treating the acetylene-containing gas stream with an adsorbent at a temperature below −40° F. and substantially the same as the outlet temperature of said second creeping pebble bed regenerator to remove final amounts of condensable materials and substantially all of the higher acetylene and discharging the resultant gas stream from the adsorbent at a temperature below 32° F. so as to substantially prevent polymerization of the hydrocarbon impurities adsorbed therein; contacting the resultant purified gas stream with a solvent at a temperature below about −120° F. and a pressure of less than about 2 atmospheres absolute, said solvent selectively absorbing acetylene and thereby separating the acetylene from some of the less soluble impurities and from most of the non-condensables; recycling said less soluble and non-condensable materials as said cold vent gas stream for heat exchange in said second creeping pebble bed regenerative heat exchanger; venting the remaining less soluble impurities from the solvent; and recovering the acetylene from the solvent.

9. A process of producing acetylene from an in-gas containing a suitable hydrocarbon stock which comprises the steps of directing a hot combustion gas mixture through passages of a first regenerative mass to heat such mass to a suitable reaction temperature; directing through said passages of the heated first regenerative mass an in-gas containing hydrogen and said hydrocarbon stock in a molar ratio of between about 2 to 6 moles of hydrogen for each carbon atom of the hydrocarbon molecule and reacting said in-gas for a period of between about 0.01 and 0.05 second and at a pressure of between about 1 and 2 atmospheres absolute in contact with such first heated regenerative mass so as to convert at least part of such in-gas to acetylene; discharging the acetylene-containing reacted gas from the first regenerative mass passages as said valuable off-gas and directing such hot gas through passages of a second relatively cool regenerative mass for quenching the off-gas to a lower temperature at which relatively little acetylene decomposition occurs; discharging the quenching off-gas from said passages in the warmed second regenerative mass, and recovering the heat abstracted by said second regenerative mass from the hot off-gas by providing an oxidant gas and directing such oxidant gas through the second regenerative mass passages; providing a combustible fuel and burning such fuel with the heated oxidant gas so as to form said hot combustion gas mixture; discharging the acetylene-containing off-gas from said heated reaction zone; cooling said off-gas in a first creeping pebble bed regenerative heat exchanger to about room temperature at a pressure below about 3 atmospheres absolute in heat exchange with material selected from the class consisting of process gas and process air to remove a portion of the condensable materials contained therein; further cooling said off-gas in a second creeping pebble bed regenerative heat exchanger to about −120° F. to −130° F. at a pressure below about 3 atmospheres absolute in heat exchange with a cold vent gas stream to remove additional amounts of condensable materials; treating the acetylene-containing gas stream with an adsorbent at a temperature below −40° F. and substantially the same as the outlet temperature of said second creeping pebble bed regenerator to remove final amounts of condensable materials and substantially all of the higher acetylenes and discharging the resultant gas stream from the adsorbent at a temperature below 32° F. so as to substantially prevent polymerization of the hydrocarbon impurities adsorbed therein; contacting the resultant purified gas stream with a solvent at a temperature below about −120° F. and a pressure of less than about 2 atmospheres absolute, said solvent selectively absorbing acetylene and thereby separating the acetylene from some of the less soluble impurities and from most of the non-condensables; recycling said less soluble and non-condensable materials as said cold vent gas stream for heat exchange in said second creeping pebble bed regenerative heat exchanger; venting the remaining less soluble impurities from the solvent; and recovering the acetylene from the solvent.

10. The process in accordance with claim 9 wherein the absorbent is silica gel and the solvent is acetone.

11. A process of producing acetylene from an in-gas containing a suitable hydrocarbon stock which comprises the steps of directing a hot combustion gas mixture through passages of a first regenerative mass to heat such mass to a suitable reaction temperature; directing through said passages of the heated first regenerative mass an in-gas containing hydrogen and said hydrocarbon stock in a molar ratio of between about 1 to 8 moles of hydrogen for each carbon atom of the hydrocarbon molecule and reacting said in-gas for a period of between about 0.01 and 0.05 second and at a pressure of between about 1 and 2 atmospheres absolute in contact with such first heated regnerative mass so as to convert at least part of such in-gas to acetylene; discharging the acetylene-containing reacted gas from the first regenerative mass passages as said valuable off-gas and directing such hot gas through passages of a second relatively cool regenerative mass for quenching the off-gas to a lower temperature at which relatively little acetylene decomposition occurs; discharging the quenching off-gas from said passages in the warmed second regenerative mass, and recovering the heat abstracted by said second regenerative mass from the hot off-gas by providing an oxidant gas and directing such oxidant gas through the second regenerative mass passages; providing a combustible fuel and burning such fuel with the heated oxidant gas so as to form said hot combustion gas mixture; discharging the acetylene-containing off-gas from said heated reaction zone; separating from said off-gas stream at least part of the remaining hydrogen-containing gas and recycling said hydrogen-containing gas to said heat reaction zone so as to provide at least part of the hydrogen of said in-gas; progressively cooling said off-gas stream to a temperature of about −120° F. to −160° F. under pressures of less than about 3 atmospheres absolute to remove a substantial portion of the condensable materials contained therein; contacting the cold gas stream with an adsorbent at a temperature below 32° F. to remove final amounts of condensable materials and at least some amounts of higher acetylenes and discharging the resultant gas stream from the adsorbent at a temperature below 32° F. so as to substantially prevent polymerization of the hydrocarbon impurities adsorbed therein; contacting the resultant partially purified gas stream at a temperature below about −120° F. and a pressure of less than about 2 atmospheres absolute with a solvent wherein the acetylene is selectively dissolved to separate said acetylene from some of the less soluble impurities and from most of the substantially insoluble non-condensable materials in the gas stream; venting the remaining reductively less soluble impurities from the solvent; and recovering the acetylene from said solvent.

12. A process of producing acetylene from an in-gas containing a suitable hydrocarbon stock which comprises the steps of directing a hot combustion gas mixture through passages of a first regenerative mass to heat such mass to a suitable reaction temperature; directing through said passages of the heated first regenerative mass an in-gas containing hydrogen and said hydrocarbon stock in a molar ratio of between about 1 to 8 moles of hydrogen for each carbon atom of the hydrocarbon molecule and reacting said in-gas for a period of between about 0.01 and 0.05 second and at a pressure of between about 1 and 2 atmospheres absolute in contact with such first heated regenerative mass so as to convert at least part of such in-gas to acetylene; discharging the acetylene-containing reacted gas from from the first regenerative mass passages as said valuable off-gas and directing such hot gas through passages of a second relatively cool regenerative mass for quenching the off-gas to a lower temperature at which relatively little acetylene decomposition occurs; discharging the quenching off-gas from said passages in the warmed second regenerative mass, and recovering the heat abstracted by said second regenerative mass from the hot off-gas by providing an oxidant gas and directing such oxidant gas through the second regenerative mass passages; providing a combustible fuel and burning such fuel with the heated oxidant gas so as to form said hot combustion gas mixture; discharging the acetylene-containing off-gas from said heated reaction zone; separating from said off-gas stream at least part of the remaining hydrogen-containing gas and recycling said hydrogen-containing gas to said heat reaction zone so as to provide at least part of the hydrogen of said in-gas; cooling said off-gas in a first creeping pebble bed regenerative heat exchanger to about room temperature in heat exchange with material selected from the class consisting of process gas and process air to remove a portion of the condensable materials contained therein; further cooling said off-gas in a second creeping pebble bed regenerative heat exchanger to about −120° F. to −130° F. in heat exchange with a cold vent gas stream to remove additional amounts of condensable materials; treating the acetylene-containing gas stream with an adsorbent at a temperature below −40° F. and substantially the same as the outlet temperature of said second creeping pebble bed regenerator to remove final amounts of condensable materials and substantially all of the higher acetylenes and discharging the resultant gas stream from the adsorbent at a temperature below 32° F. so as to substantially prevent polymerization of the hydrocarbon impurities adsorbed therein; contacting the resulant purified gas stream with a solvent at a temperature below about −120° F. and a pressure of less than about 2 atmospheres absolute, said solvent selectively absorbing acetylene and thereby separating the acetylene from some of the less soluble impurities and from most of the non-condensables; recycling said less soluble and non-condensable materials as said cold vent gas stream for heat exchange in said second creeping pebble bed regenerative heat exchanger; venting the remaining less soluble impurities from the solvent; and recovering the acetylene from the solvent.

13. The process in accordance with claim 12 wherein the absorbent is silica gel and the solvent is acetone.

14. A process of producing acetylene from an in-gas containing a suitable hydrocarbon stock, which comprises the steps of directing through passages of a heated first regenerative mass as a reaction stroke, an in-gas containing hydrogen and said hydrocarbon stock in a molar ratio of between about 1 to 8 moles of hydrogen for each carbon atom of the hydrocarbon molecule and reacting said in-gas in contact with such first heated regenerative mass so as to convert at least part of such in-gas to acetylene; discharging the acetylene-containing reacted gas from the first regenerative mass passages as said valuable off-gas and quenching such hot gas by flow through passages of a second relatively cool regenerative mass to cool such off-gas to a lower temperature at which relatively little acetylene decomposition occurs and simultaneously heat the second regenerative mass; discharging the quenched off-gas from said passages in the heated second regenerative mass; as a simultaneous regenerative stroke, providing an oxidant gas and directing such oxidant gas through passages of a heated third regenerative mass so as to preheat such oxidant and simultaneously recool such third mass for subsequent countercurrent passage of hot off-gas therethrough; providing a combustible fuel and burning such fuel with part of the preheated oxidant gas to form a hot combustion gas mixture, the relative quantities of combustible fuel and oxidant gas being such that an excess of unreacted oxidant gas remains after such combustion; directing the hot combustion gas mixture and unreacted oxidant gas through passages of a cooled fourth regenerative mass so as to heat such mass for subsequent reaction of countercurrently flowing in-gas therein, and simultaneously regenerate the mass by burning off carbon deposited in said passages during the previous reaction stroke, the burnoff being effected by said unreacted oxidant gas; discharging the combustion gas mixture and the carbon oxides-containing reduced gas from the heated and regenerated fourth mass; and periodically reversing the fluid flows between the first and second regenerative masses, and the third and fourth regenerative masses so that the third and fourth masses are on reaction stroke with said in-gas flowing through the fourth regenerative mass passages for reaction therein and the resulting off-gas flowing through the third regenerative mass passages for quenching therein, and the first and second masses are on regenerative stroke with said oxidant gas flowing through the second regenerative mass passages for preheating therein, and said hot combustion gas mixture and unreacted oxidant gas flowing through the first regenerative mass passages for heating and regeneration of such mass; progressively cooling said off-gas stream to a temperature of about $-120°$ F. to $-160°$ F. under pressures of less than about 3 atmospheres absolute to remove a substantial portion of the condensable materials therefrom; contacting the cold gas stream with an adsorbent at a temperature below $32°$ F. to remove final amounts of condensable materials and at least some amounts of higher acetylenes and discharging the resultant gas stream from the adsorbent at a temperature below $32°$ F. so as to substantially prevent polymerization of the hydrocarbon impurities adsorbed therein; contacting the resultant partially purified gas stream at a temperature below about $-120°$ F. and a pressure of less than about 2 atmospheres absolute with a solvent which selectively dissolves acetylene to separate the acetylene from some of the relatively less soluble impurities and from most of the substantially insoluble non-condensable materials in the gas stream; venting the remaining reductively less soluble impurities from the solvent; and recovering the acetylene from the solvent.

15. A process of producing acetylene from an in-gas containing a suitable hydrocarbon stock, which comprises the steps of directing through passages of a heated first regenerative mass as a reaction stroke, an in-gas containing hydrogen and said hydrocarbon stock in a molar ratio of between about 2 to 6 moles of hydrogen for each carbon atom of the hydrocarbon molecule and reacting said in-gas for a period of between 0.01 and 0.05 second and at a pressure of between about 1 and 2 atmospheres in contact with such first heated regenerative mass so as to convert at least part of such in-gas to acetylene; discharging the acetylene-containing reacted gas from the first regenerative mass passages as said valuable off-gas and quenching such hot gas by flow through passages of a second relatively cool regenerative mass to cool such off-gas to a lower temperature at which relatively little acetylene decomposition occurs and simultaneously heat the second regenerative mass; discharging the quenched off-gas from said passages in the heated second regenerative mass; as a simultaneous regenerative stroke, providing an oxidant gas and directing such oxidant gas through passages of a heated third regenerative mass so as to preheat such oxidant and simultaneously recool such third mass for subsequent countercurrent passage of hot off-gas therethrough; providing a combustible fuel and burning such fuel with part of the preheated oxidant gas to form a hot combustion gas mixture, the relative quantities of combustible fuel and oxidant gas being such that an excess of unreacted oxidant gas remains after such combustion; directing the hot combustion gas mixture and unreacted oxidant gas through passages of a cooled fourth regenerative mass so as to heat for a period of between 0.01 and 0.05 second and at a pressure of between about 1 and 2 atmospheres absolute such mass for subsequent reaction of countercurrently flowing in-gas therein, and simultaneously regenerate the mass by burning off carbon deposited in said passages during the previous reaction stroke, the burnoff being effected by said unreacted oxidant gas; discharging the combustion gas mixture and the carbon oxides-containing reduced gas from the heated and regenerated fourth mass; and periodically reversing the fluid flows between the first and second regenerative masses, and the third and fourth regenerative masses so that the third and fourth masses are on reaction stroke with said in-gas flowing through the fourth regenerative mass passages for reaction therein and the resulting off-gas flowing through the third regenerative mass passages for quenching therein, and the first and second masses are on regenerative stroke with said oxidant gas flowing through the second regenerative mass passages for preheating therein, and said hot combustion gas mixture and unreacted oxidant gas flowing through the first regenerative mass passages for heating and regeneration of such mass; progressively cooling said off-gas stream to a temperature of about $-120°$ F. to $-160°$ F. under pressures of less than about 3 atmospheres absolute to remove a substantial portion of the condensable materials contained therein; contacting the cold gas stream with an adsorbent at a temperature below $32°$ F. to remove final amounts of condensable materials and at least some amounts of higher acetylenes and discharging the resultant gas stream from the adsorbent at a temperature below $32°$ F. so as to substantially prevent polymerization of the hydrocarbon impurities adsorbed therein; contacting the resultant partially purified gas stream at a temperature below about $-120°$ F. and a pressure of less than about 2 atmospheres absolute with a solvent wherein the acetylene is selectively dissolved to separate said acetylene from some of the less soluble impurities and from most of the substantially insoluble non-condensable materials in the gas stream; venting the remaining reductively less soluble impurities from the solvent; and recovering the acetylene from said solvent.

16. A process of producing acetylene from an in-gas containing a suitable hydrocarbon stock, which comprises the steps of directing through passages of a heated first regenerative mass as a reaction stroke, an in-gas containing hydrogen and said hydrocarbon stock in a molar ratio of between about 2 to 6 moles of hydrogen for each carbon atom of the hydrocarbon molecule and reacting said in-gas for a period of between 0.01 and 0.05 second and at a pressure of between about 1 and 2 atmospheres in contact with such first heated regenerative mass so as to convert at least part of such in-gas to acetylene; discharging the acetylene-containing reacted gas from the first regenerative mass passages as said valuable off-gas and quenching such hot gas by flow through passages of a second relatively cool regenerative mass to cool such off-gas to a lower temperature at which relatively little acetylene decomposition occurs and simultaneously heat the second regenerative mass; discharging the quenched off-gas from said passages in the heated second regenerative mass; as a simultaneous regenerative stroke, providing an oxidant gas and directing such oxidant gas through passages of a heated third regenerative mass so as to preheat such oxidant and simultaneously recool such third mass for subsequent countercurrent passage of hot off-gas therethrough; providing a combustible fuel and burning such fuel with part of the preheated oxidant gas to form a hot combustion gas mixture, the relative quantities of combustible fuel and oxidant gas being such that an excess of unreacted oxidant gas remains after such combustion; directing the hot combustion gas mixture and unreacted oxidant gas through passages of a cooled fourth regenerative mass so as to heat for a period of between 0.01 and 0.05 second and at a pressure of between about 1 and 2 atmospheres absolute such mass for subsequent reaction of countercurrently flowing in-gas therein, and simultaneously regenerate the mass by burning off carbon deposited in said passages during the previous reaction stroke, the burnoff being effected by said unreacted oxidant gas; discharging the combustion gas mixture and the carbon oxides-containing reduced gas from the heated and regenerated fourth mass; and periodically reversing the fluid flows between the first and second regenerative masses, and the third and fourth regenerative masses so that the third and fourth masses are on reaction stroke with said in-gas flowing through the fourth regenerative mass passages for reaction therein and the resulting off-gas flowing through the third regenerative mass passages for quenching therein, and the first and second masses are on regenerative stroke with said oxidant gas flowing through the second regenerative mass passages for preheating therein, and said hot combustion gas mixture and unreacted oxidant gas flowing through the first regenerative mass passages for heating and regeneration of such mass; cooling said off-gas in a first creeping pebble bed regenerative heat exchanger to about room temperature at a pressure below about 3 atmospheres absolute in heat exchange with material selected from the class consisting of process gas and process air to remove a portion of the condensable materials contained therein; further cooling said off-gas in a second creeping pebble bed regenerative heat exchanger to about −120° F. to −130° F. at a pressure below about 3 atmospheres absolute in heat exchange with a cold vent gas stream to remove additional amounts of condensable materials; treating the acetylene-containing gas stream with an adsorbent at a temperature below −40° F. and substantially the same as the outlet temperature of said second creeping pebble bed regenerator to remove final amounts of condensable materials and substantially all of the higher acetylenes and discharging the resultant gas stream from the adsorbent at a temperature below 32° F. so as to substantially prevent polymerization of the hydrocarbon impurities adsorbed therein; contacting the resultant purified gas stream with a solvent at a temperature below about −120° F. and a pressure of less than about 2 atmospheres absolute, said solvent selectively absorbing acetylene and thereby separating the acetylene from some of the less soluble impurities and from most of the noncondensables; recycling said less soluble and non-condensable materials as said cold vent gas stream for heat exchange in said second creeping pebble bed regenerative heat exchanger; venting the remaining less soluble impurities from the solvent; and recovering the acetylene from the solvent.

17. The process in accordance with claim 16 wherein the absorbent is silica gel and the solvent is acetone.

18. A process of producing acetylene from an in-gas containing a suitable methane stock, which comprises the steps of directing through passages of a heated first regenerative mass as a reaction stroke, an in-gas containing hydrogen and said methane stock in a molar ratio of hydrogen to methane of about 1 to 8 and reacting said in-gas for a period of between 0.01 and 0.05 second and at a pressure of between about 1 and 2 atmospheres in contact with such first heated regenerative mass so as to convert at least part of such in-gas to acetylene; discharging the acetylene-containing reacted gas from the first regenerative mass passages as said valuable off-gas and quenching such hot gas by flow through passages of a second relatively cool regenerative mass to cool such off-gas to a lower temperature at which relatively little acetylene decomposition occurs and simultaneously heat the second regenerative mass; discharging the quenched off-gas from said passages in the heated second regenerative mass; as a simultaneous regenerative stroke, providing an oxidant gas and directing such oxidant gas through passages of a heated third regenerative mass so as to preheat such oxidant and simultaneously cool such third mass for subsequent countercurrent passage of hot off-gas therethrough; providing a combustible fuel and burning such fuel with part of the preheated oxidant gas to form a hot combustion gas mixture, the relative quantities of combustible fuel and oxidant gas being such that an excess of unreacted oxidant gas remains after such combustion; directing the hot combustion gas mixture and unreacted oxidant gas through passages of a cooled fourth regenerative mass so as to heat such mass for subsequent reaction of countercurrently flowing in-gas therein, and simultaneously regenerate the mass by burning off carbon deposited in said passages during the previous reaction stroke, the burnoff being effected by said unreacted oxidant gas; discharging the combustion gas mixture and the carbon oxides-containing reduced gas from the heated and regenerated fourth mass; and periodically reversing the fluid flows between the first and second regenerative masses, and the third and fourth regenerative masses so that the third and fourth masses are on reaction stroke with said in-gas flowing through the fourth regenerative mass passages for reaction therein and the resulting off-gas flowing through the third regenerative mass passages for quenching therein, and the first and second masses are on regenerative stroke with said oxidant gas flowing through the second regenerative mass passages for preheating therein, and said hot combustion gas mixture and unreacted oxidant gas flowing through the first regenerative mass passages for heating and regeneration of such mass; cooling said off-gas in a first creeping pebble bed regenerative heat exchanger to about room temperature at a pressure below about 3 atmospheres absolute in heat exchange with material selected from the class consisting of process gas and process air to remove a portion of the condensable materials contained therein; further cooling said off-gas in a second creeping pebble bed regenerative heat exchanger to about −120° F. to −130° F. at a pressure below about 3 atmospheres absolute in heat exchange with a cold vent gas stream to remove additional amounts of condensable materials; treating the acetylene-containing gas stream with an adsorbent at a temperature below −40° F. and substantially the same as the outlet temperature of said second creeping pebble bed regenerator to remove final amounts of condensable materials and substantially all of the higher acetylenes and discharging the resultant gas stream from the adsorbent at a temperature below 32° F. so as to substantially prevent polymerization of the hydrocarbon impurities adsorbed therein; contacting the resultant purified gas stream with a solvent at a temperature below about −120° F. and a pressure of less than about 2 atmospheres absolute, said solvent selectively absorbing acetylene and thereby separating the acetylene from some of the less soluble impurities and from most of the non-condensables; recycling said less soluble and non-condensable materials as said cold vent gas stream for heat exchange in said second creeping pebble bed regenerative heat exchanger; venting the remaining less soluble impurities from the solvent; and recovering the acetylene from the solvent.

19. The process in accordance with claim 18 wherein the absorbent is silica gel and the solvent is acetone.

References Cited in the file of this patent

UNITED STATES PATENTS

| | | |
|---|---|---|
| 1,942,131 | Baumann et al. | Jan. 2, 1934 |
| 1,973,840 | Zobel et al. | Sept. 18, 1934 |
| 2,558,861 | Liggett | July 3, 1951 |
| 2,692,819 | Hasche et al. | Oct. 26, 1954 |
| 2,751,424 | Hasche | June 19, 1956 |
| 2,886,612 | McIntire | May 12, 1959 |

FOREIGN PATENTS

| | | |
|---|---|---|
| 316,888 | Great Britain | May 22, 1930 |